(12) United States Patent
Peuler

(10) Patent No.: US 6,286,264 B1
(45) Date of Patent: Sep. 11, 2001

(54) HORIZONTALLY SLIDABLE SPORTS FIELD

(75) Inventor: Raimund Peuler, Breckerfeld (DE)

(73) Assignee: Schiess-Defries Engineering Immobilien-und Bautrager GmbH, Duisberg (DE)

( * ) Notice: Subject to any disclaimer, the term of this patent is extended or adjusted under 35 U.S.C. 154(b) by 0 days.

(21) Appl. No.: 09/230,601

(22) PCT Filed: Jul. 5, 1997

(86) PCT No.: PCT/DE97/01436

§ 371 Date: Jul. 22, 1999

§ 102(e) Date: Jul. 22, 1999

(87) PCT Pub. No.: WO98/04778

PCT Pub. Date: Feb. 5, 1998

(30) Foreign Application Priority Data

Jul. 27, 1996 (DE) ............................................... 196 30 423

(51) Int. Cl.[7] ....................................................... E04H 3/10
(52) U.S. Cl. ............................. 52/6; 52/7; 52/10; 52/111
(58) Field of Search ................................... 52/6, 7, 9, 10, 52/111

(56) References Cited

U.S. PATENT DOCUMENTS

| 3,515,444 | 6/1970 | Grabner . |
| 5,746,028 | * 5/1998 | DiBenedetto ................ 52/6 |
| 5,927,022 | * 7/1999 | Hirakawa et al. ............ 52/6 |
| 5,979,116 | * 11/1999 | Myoga ........................... 52/8 |

FOREIGN PATENT DOCUMENTS

| 380501 | 10/1985 | (AT) . |
| 2064715 | 7/1972 | (DE) . |
| 2112086 | 9/1972 | (DE) . |
| 2543176 | 4/1977 | (DE) . |
| 4005951 | 8/1980 | (DE) . |
| 3611753 | 3/1987 | (DE) . |
| 0288441 | 10/1988 | (EP) . |
| 1495042 | 12/1977 | (GB) . |
| 2263444 | 8/1993 | (GB) . |

OTHER PUBLICATIONS

"Versetzen einer kleinen Kirche" ("Moving a small church") *Bautechnik* 71 vol. 7, 1994,.

* cited by examiner

*Primary Examiner*—Christopher T. Kent
*Assistant Examiner*—Jennifer I. Thissell
(74) *Attorney, Agent, or Firm*—Herbert Dubno

(57) ABSTRACT

A sports field, in particular for team sports such as football, has a playing field (20) which consists of a overing made of grass, granulates or other natural and/or artificial materials, placed on an infrastructure (21), in particular made of earth and/or gravel. Also disclosed is a process for horizontally displacing the sports field (20). To allow such a sports field to be horizontally displaced, the sports field is arranged on a preferably trough-shaped supporting frame (22) substantially made of concrete and/or steel parts, and which can be displaced on sliding pads supported on fixed sliding tracks (23).

16 Claims, 11 Drawing Sheets

HORIZONTALLY SLIDABLE SPORTS FIELD

CROSS REFERENCE TO RELATED APPLICATIONS

This application is the US national phase of PCT application PCT/DE97/01436 filed Jul. 5, 1997 with a claim to the priority of German patent application filed Jul. 27, 1996.

FIELD OF THE INVENTION

The invention relates to a playing field, in particular for team sports such as soccer, with a playing surface formed of grass, particulate or similar natural and/or synthetic layer, and a substrate in particular of earth and/or clay or the like.

The invention further relates to a method for horizontally displacing this playing field.

BACKGROUND OF THE INVENTION

Today's known soccer stadiums have a grass playing field with a standardized size of about 75 m×115 m. If necessary the playing field is also provided with a track for light athletic sports. Viewing stands are provided around the playing field and if necessary around the track. Stadiums are also known that are partially covered. Some of the soccer fields have drainage that carries away water during and after heavy rainfall. In individual cases there are also special surface heaters, for example in the Munich Olympic Stadium, so that the field can be played on and used even in winter. The grass can thus be maintained free of snow and ice and relatively dry.

The construction and maintenance of such stadiums are relatively expensive so for commercial reasons there is a need to use these stadiums also for other purposes as for instance for concerts. Above all this subjects the grass surface either directly or through a covering put over it to some damage.

In addition there are multipurpose venues, such as for instance the Dortmund/Westphalia Hall, where the inside surface and the viewing stands are completely under cover. According to use, as for example bicycle races, tennis, team sports, handball, volleyball, or stage shows or concerts, the hall interior is provided with the appropriate ground covering. Nonetheless in the existing European halls the usable inside space is too small to hold a soccer field. A big enough multipurpose hall would not be suitable for a permanent grass covering since the natural conditions necessary (sunlight, rain) are lacking in a closed hall. These requirements can be partially met by an openable or slideback roof. in any case there is the disadvantage that the grass gets damaged when used for certain purposes since it can only be otherwise used for short times. On the other hand grass is only periodically used, for example every two weeks for during the regular soccer season. A solution of this problem can be the use of sod which is set out in strips and rolled up afterward, but such a system is not only expensive, but the sod surface does not bond solidly to the underlying earth and constant removal and reuse quickly kills the grass. The invention is aimed at this problem.

OBJECT OF THE INVENTION

It is an object of this invention to provide a playing field of the above-described type that without the above-cited disadvantages can be moved horizontally relatively quickly without damaging the playing surface, in particular the grass. To this end this object should be obtained in that when the grass surface is not used it is wholly displaced outside the hall.

SUMMARY OF THE INVENTION

This object is attained according to the invention in that the entire playing field including the substrate lies on a preferably trough-shaped support frame that is mainly formed of concrete and/or steel members, and the support frame is horizontally slidable via slide pads on stationary slide tracks. Preferably the slide tracks extend from a fully or partially covered stadium or multipurpose hall to an adjacent outside space, preferably a parking lot. This construction has the advantage that only for sporting activities that are conducted on grass is the complete support frame slid into the hall and afterward slide back out outside. The slide tracks can be set in the floor of the multipurpose hall or stadium where they are no hindrance to walking. The same is true for the outside area which is free to use, e.g. as a parking lot. In this manner it is possible to produce a stadium that can be set up inside for any type of use so that costs for the slide construction are amortized in a short time. Basically the instant invention can be used for size of space covered with natural plants that in only used part of the time at a particular location, that is in a hall, and after use can be slid back outside.

In order not to lose any spectator area in the stadium or multipurpose hall, it is provided according to a further feature that the support frame is slidable underneath reviewing stands in the stadium or multipurpose hall where there is an opening. The opening can be closed by sliding doors, flaps, or the like.

The number of slide pads is determined by the weight of the support structure and the playing field on it, which in a grass field of 75 m×115 m can be over 100,000 kN. With such great weights preferably slide pads with a track-engaging surface of polytetrafluorethylene (PTFE) and slide tracks of steel with a special coating are used. Combinations of PTFE, which is sold under the trade name Teflon, and austenitic steel are in fact already known in bridge constructions as equalizing joints, but there the slide paths are relatively small. Surprisingly it has been determined that slide pads with polytetrafluorethylene plates that slide on a coated slide track provided with a slide film can be used for sliding great weights over great distances. Basically according to the invention known lubricants, such as silicon oil or lithium soap can be used, preferably however a thin water-soluble oil and/or grease film is used on the slide tracks. The slide pads, that is the PTFE plates, have on their undersides lubricant pockets and/or oil- and/or grease-distributing grooves which increase the slidability while minimizing friction. With this combination of PTFE and lubricant or oil and coated steel sliding frictions of from 0.018 to 0.025 can be obtained. In order to overcome static friction the pushing force is such that a sliding up to a friction of 0.07 can be exerted for breaking free.

According to a feature of the invention the support frame is supported on a plurality of vertical posts which are arranged in several parallel rows standing on anchor plates, on so-called load knot points. These posts are preferably made of concrete, on each of whose undersides is (from top to bottom) a support plate, several respective elastomeric bodies in which are embedded plates to increase the horizontal resistance to shear of the elastomer, and finally several PTFE pads. The elastomeric layer is vulcanized into the support plate and elastically supports the load so that height differences in the slide track are compensated for. The steel plate vulcanized under the elastomeric layer have grooves for holding and trapping the PTFE plate inserts that are preferably 5 mm thick.

Basically it is possible to provide the slide tracks manually or by separate means with a thin grease and/or oil film. In order however to avoid this cost according to a further feature of the invention oil/grease applicators are provided relative to the two slide directions in front of and behind the PTFE pads on a protective housing of the support plate, are preferably supplied with oil and/or grease by hoses, and are mounted above the slide tracks. An appropriate conduit system thus allows the necessary quantity of grease and/or oil automatically to be applied during the advance.

In order to protect the parts underneath the support plates, in particular from dust and dirt, a protective housing is secured on the concrete anchor which extends around and over the support plate and the parts secured thereto and which preferably has dirt scrapers guided on the slide tracks and mounted on edges turned toward the slide tracks. Thus during advance it is possible to preclean the slide tracks so that dirt on them does not mix with the grease and/or oil. The dirt-protecting housing can also be otherwise mounted so long as each oil distributor and the space between the oil distributor and the PTFE pads is protected.

Preferably in order to horizontally move the support frame there is a plurality of slide actuators that can each grab on the upper flange of a respective profile set in the ground parallel to the slide tracks at successive locations, preferably via clamping jaws, and that can exert horizontally directed push or pull forces laterally on the support frame when clamped preferably by means of hydraulically actuated cylinders. As a result the required enormous sliding force necessary to move the support frame with its load can be distributed over several slide actuators. Presuming an overall weight of 104,000 kN of the overall load to be moved and 384 slide pads, so the load per bearing is 270 kN allowing for uneven distribution of up to 80 kN. The necessary sliding force for overcoming the static friction with four slide actuators each with two cylinders is 8×900 kN and when moving is about 8×360 kN.

In the clamped position each slid actuator acts as a horizontal abutment for the cylinder that is braced between the slide actuator and the playing field or its support frame and is pushing or pulling through one stroke distance. After release of the clamping and raising of the piston the cylinder can be moved along and then again fixed by the jaws whereupon the cylinder can again be advance t to step the support frame and its load until the entire distance through which the frame must move along the track is traversed. The clamping force should be dimensioned at 4×15,000 kN.

Preferably the slide actuators are connected with a travel-detecting device and a stroke synchronizer. Thus a uniform sliding and a uniform advance force is applied to the attachment points. If necessary underneath the center of the playing field in the ground there is a guide track in which ride spring-loaded guide rollers connected to the support frame and which are connected to a skewness detector for controlling the stroke synchronization, for executing a correcting action of one or more slide actuators, and/or for emergency shutting down of the slide actuators.

For occasional repairs or parts exchanges there is underneath the support frame an accessible inspection space, preferably along the entire support-frame or playing-field width.

The slide tracks themselves are formed of wide steel bars or sheet metal and are welded on their undersides to nelson-head bolts and/or are adjustable with respect to height by means of threaded sleeves and screws and/or are set in a thin bed of mortar. With these mountings which can be used together or separately, it is possible to ideally position and anchor the slide tracks in the existing horizontal surface.

Alternatively the slide tracks are formed, in particular above an inspection space as steel beams that sit on footings or footing posts.

The slide tracks have a surface coating of a thickness from 300, preferably 340, to at most 400 $\mu$m which has an orange-peel surface optimized for sliding friction. This orange-peel surface makes it possible that the lubricant is held in the valleys and improves the sliding friction. The application should be done such that it is durable so that the steel core of the slide track is protected from corrosion.

The slide tracks can themselves be formed of several pieces with between adjacent pieces at their ends a long-life elastic expansion joint. In addition according to another feature of the invention the slide-track underside is provided in the region of a slide-track end or a slide-track part end with a PTFE/austenite slide bearing to support expansion joints, as is known from bridge construction, in order to allow for expansion joints in the underlying structure.

Preferably upper and lower flanges of a slide-track bridge are provided with openings for repair work through which PTFE pads can be passed for replacement.

The slide-track bridges are provided with height-adjustable supports in order to set the concreted-in slide-track ends level with the bridge ends.

The other object is further achieved in that a successive shifting of the support frame is done by cylinder strokes in individual steps.

BRIEF DESCRIPTION OF THE DRAWINGS

Further embodiments of the invention are described in the following with reference to the drawing. Therein.

SPECIFIC DESCRIPTION

Figure 1:
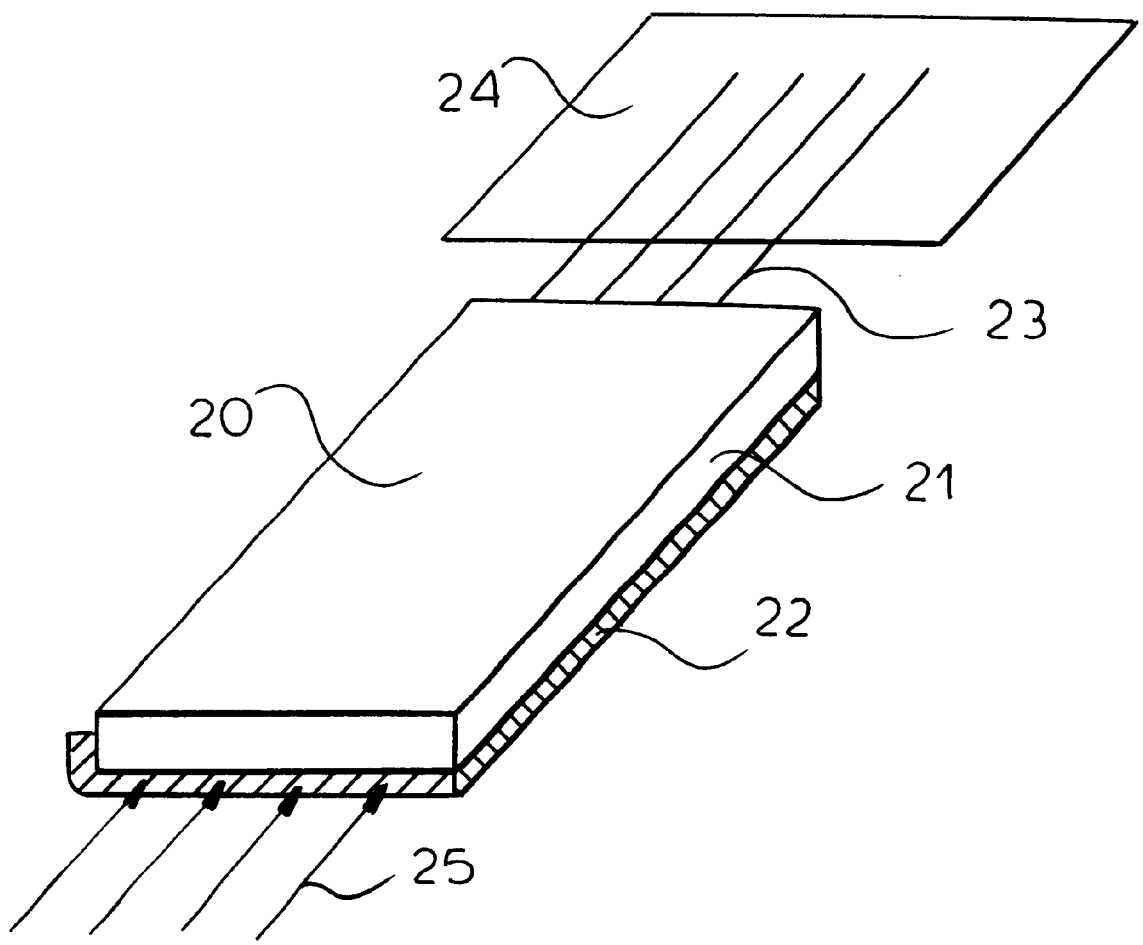
FIG. 1 is a schematic representation of the playing field according to the invention showing the slide rails.
Figure 2:
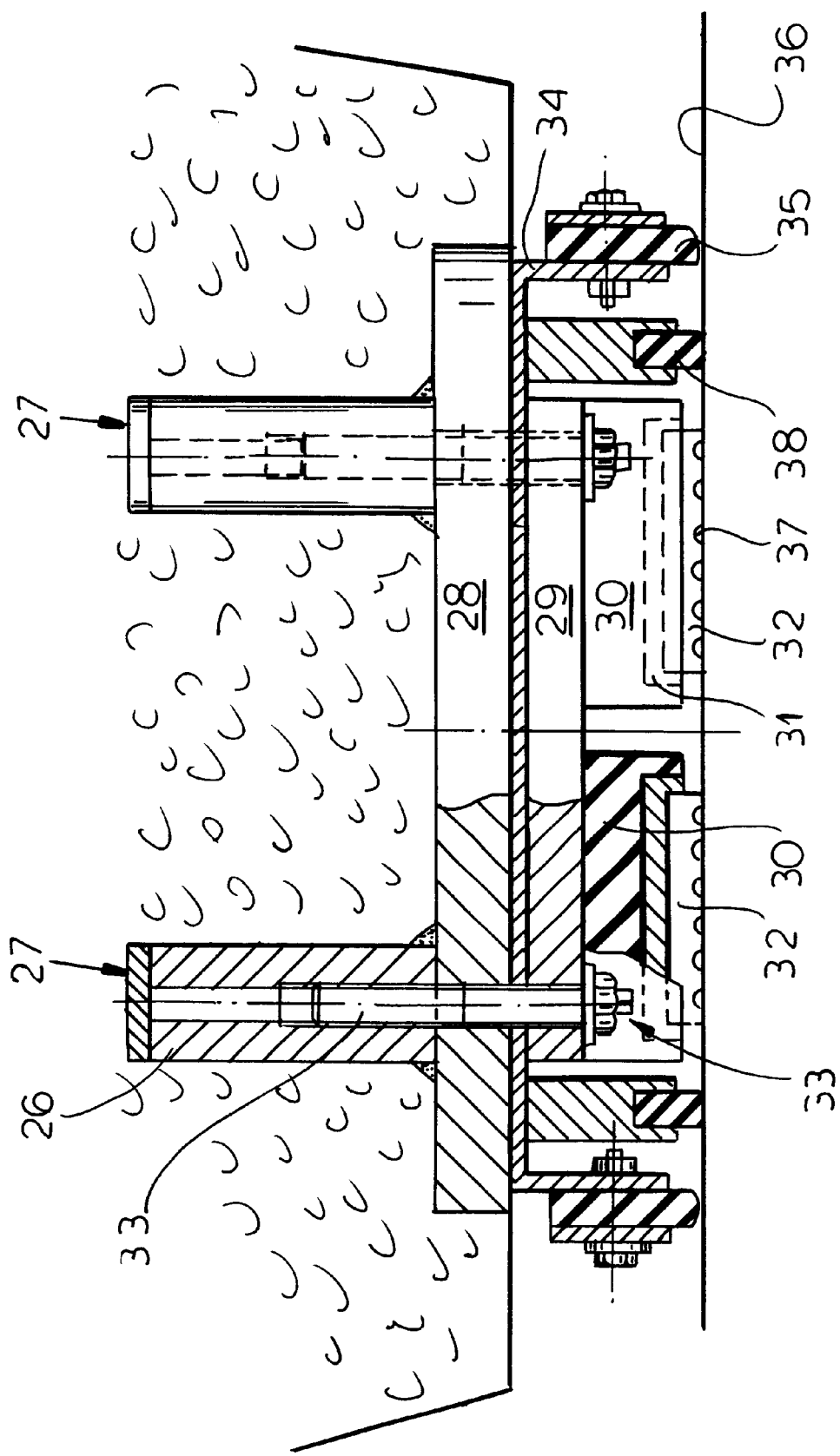
FIGS. 2 and 3 are different partially sectional side view of the structure below the support frame posts.

As can be seen in FIG. 1 an entire soccer field including a substrate 21 formed generally of earth and a clay layer is mounted on a trough-shaped-support frame 22 supported from underneath on slides that are supported on slide tracks 23 extending into the field 24 and above which the support frame is movable by a horizontal force as shown by the arrow 25. Preferably the soccer field is pulled out of and pushed back into a stadium. The support frame 22 is formed generally of concrete and/or steel. The fill 21 in the support frame or the trough therein can hold drainage pipes, lawn heaters, or similar systems. The playing field is rectangular and has for example a dimension of 75 m×115 m. In this practical embodiment there are overall sixteen tracks that extend from an unillustrated covered stadium into an area 24 serving as parking lot. The playing field can if necessary after taking down the goal posts or other structures be drawn out under the stands into the parking lot. In the time during which the playing field is in the stadium the area 24 can be used as a parking lot. Four actuators are used for the horizontal shifting, extending in four concrete slide tracks described in more detail below.

The construction of the playing field which is gone into below is about 1.2 m high and accessible from below, that is provided with a space under the playing-field floor about 0.6 m high. In front of the stands under which the playing field and the support frame 22 can move there is provided in the stadium basement an accessible inspection area which extends over the entire width of the playing field under the frame 22 so that posts, slide pads, lubricating devices, and piping described below can be checked from below. The slide pads are lubricated on the slide tracks 23 with a water-soluble oil. In order to minimize friction a combination is used of slide pads of PTFE, lubricant of grease or oil, and a slide track of coated steel. Sliding-friction coefficients in the range of $\mu$=0.018 to 0.025 are obtained. For safety reasons static friction after long periods of no movement in the range of about 0.07 are allowed for and the actuators, hydraulic cylinders, and track mounts are correspondingly dimensioned in order to permit breaking free with this static friction. After sliding of the field the tracks can be cleaned of grease or oil with warm water.

A special embodiment has the following characteristics:

| | |
|---|---|
| Playing-field weight | 104,000 kN |
| Number of slide bearings | 384 |
| Load per slide bearing | 270 ± 80 kN |
| Spacing of slide tracks | Max. 5 and ± 2.5 mm per 2.5 m length |
| Max. slide force | 8 × 900 kN |
| Slide-force drive | ≈8 × 360 kN |
| Slide factor | 2–5% |
| Cylinder stroke | 1.0 m |
| Field speed | |
| at slide factor ≤2.75% | max. 0.8 m/min aver. 0.7 m/min |
| at slide factor 3.4% | max. 0.65 m/min aver. 0.57 m/min |
| at slide factor 4% | max. 0.55 m/min aver. 0.48 m/min |
| at slide factor 5% | max. 0.44 m/min aver 0.385 m/min |
| Final value of the slide device | 4 × 40 kVA |
| Moves per week | 1 or 16 km in 2 years |
| Pressure of bearing on track | 10–20 n/mm$^2$ |
| Overall oil consumed per use | 30–50 l |

The support frame sits on several adjacent rows of posts that stand at their lower ends on concrete anchor plates 26, 27, and 28. The actual slide bearings of which 384 are used in this case are formed of a support plate 29, an intermediate layer 30 of an elastomer with imbedded plates, and vulcanized steel plates 31 with seats for PTFE inserts 32. The support plate 29 is secured with screws 33 with the concrete anchors 26, 27, and 28 and to the posts. Around the support plate as well as the parts thereunder is a protective housing 34 with edges carrying scrapers 35 which protect the enclosed parts from dirt and which also serve to clean the slide track. An elastomeric layer 30 is vulcanized to the support plate 29 and serves as a spring to compensate for height differences in the slide track 36. Steel plates are vulcanized to the elastomeric layer 31 and have seats for holding the PTFE plates 32. The plates 32 are about 5 mm thick and have on their slide face lubrication pockets and oil/grease-distributing grooves 37. In front of and behind the described slide bearing in this movement direction are oil-distributing strips 38 with multiple felt strips. These oil-distributing strips 38 are connected with a central lubricating system. The oil can periodically be dosed by electrical control onto the slide track 36 in a thin lubricant layer. The PTFE-plates 32 slide on this lubricant film with a sliding friction between about 0.018 to 0.025. The PTFE plates can be replaced, preferably via an inspection space, that is described below.

Figure 3:
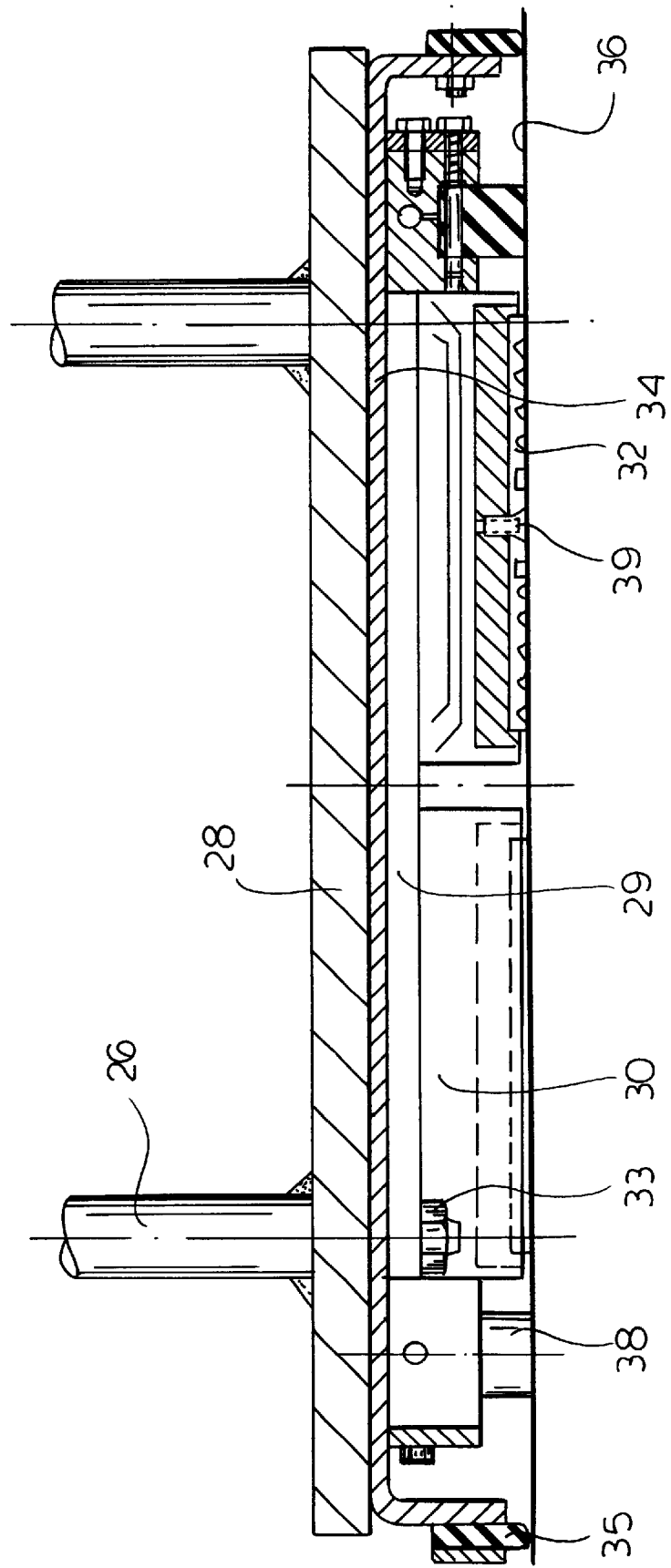
Figure 4:
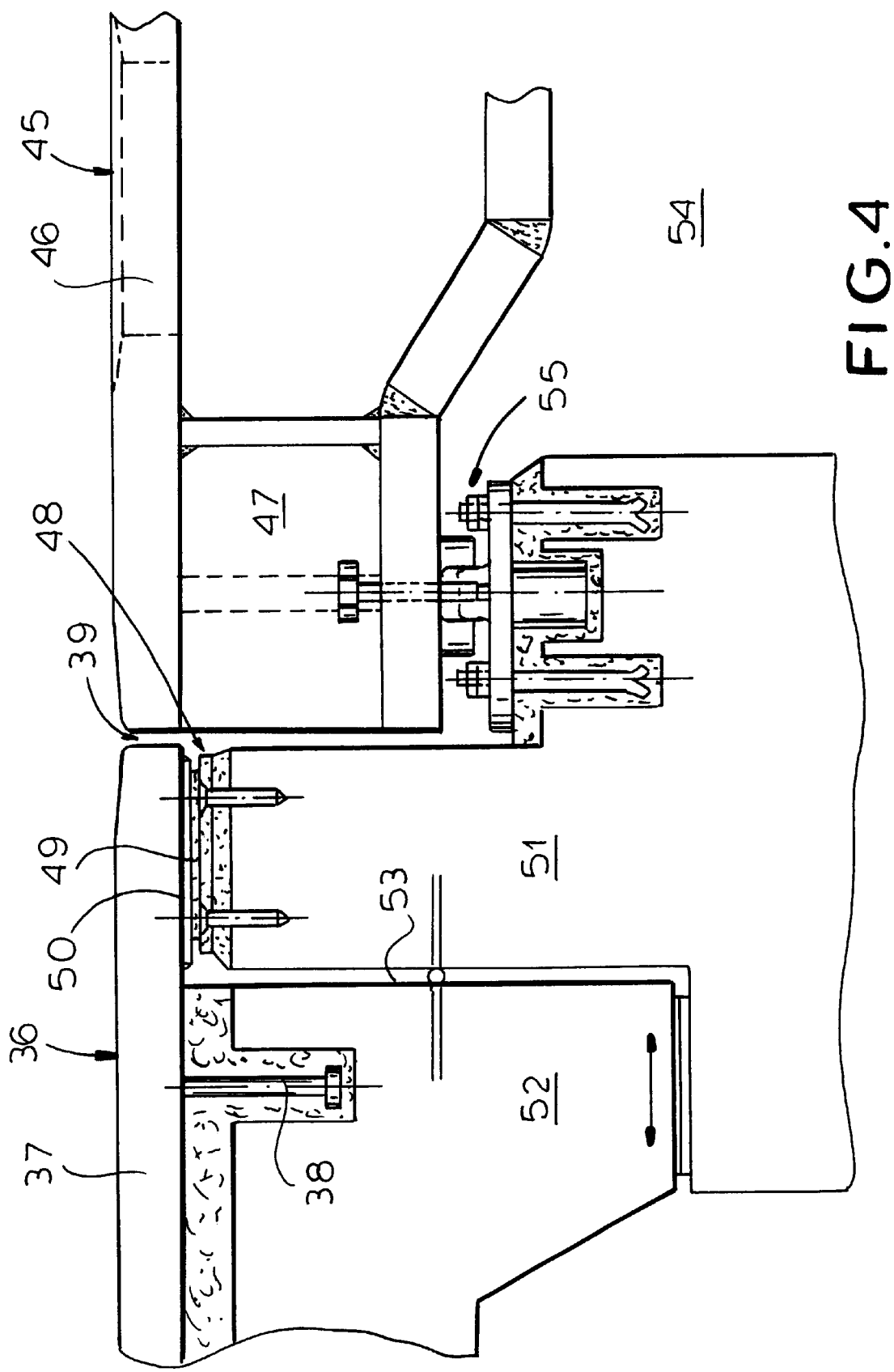
FIG. 4 is a partial section through a rail bridge and its mount in the region of an inspection space.
Figure 5:
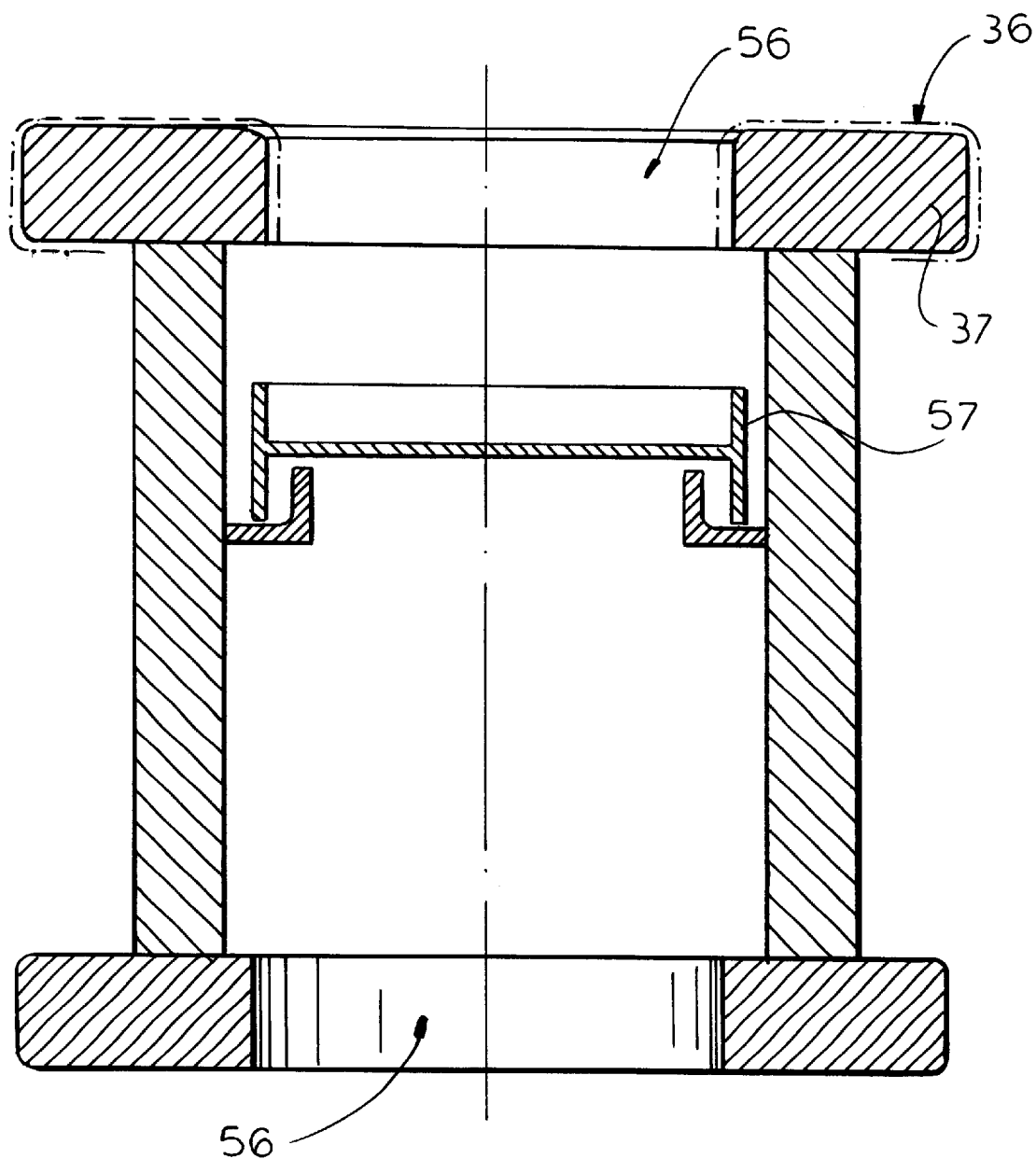
FIG. 5 is a sectional view of a repair window at a rail bridge according to FIG. 4.

As further shown in FIG. 3, the PTFE plates 32 are secured by means of recessed screws 39 to the mounted steel plates 31. The spacing of the vertical posts 26 as well as the size of the concrete anchors 26, 27, and 28 are dependent generally from the weight of the playing field to be slid, its substrate, and the support frame, but can for example have a lateral spacing of the rows of posts of 3.20 m and a spacing in the rows running in the movement direction of about 4.5 m. The slide tracks shown in FIGS. 4 to 8 are comprised of a wide steel sheet or bar 37 with rounded edges. Welded to the undersides are nelson-head bolts 38. The size and spacing of the bolts 38 is determined by the horizontal load to be withstood, for example they can be spaced two bolts 38 per 1 m. Between two abutting wide-bar ends there is a space 39 that is filled by a long-life elastomeric expansion joint 40. The slide tracks can be adjusted by sleeves 41 and screws 42 as to height and set with low-shrink mortar 43. The upper and lower faces of the slide tracks are provided with a slide coating 44. This coating consists of a rust-resisting steel coating Sa 2½n. Din 55928 T.4, a 4 $\mu$m thick basic layer of Intershield Primer EGA 780/EGA 784, an intermediate layer of red Intershield thick coating EGA 100/EGA 103 of 150 $\mu$m, and a top layer also 150 $\mu$m thick of the same layer as the intermediate layer. The overall thickness of the slide-track coating is from 340 $\mu$m to at most 440 $\mu$m. The upper surface of the slide track 36 or of its coating 44 is orange-peel-like so that the surface irregularities trap the lubricant and thus create good sliding action. If necessary smaller slide-track pieces are welded together to form a complete track and then are coated in order to form the entire slide track. It is also possible as shown in FIG. 4 to form a slide track of a flat steel bar 37 with a slide-track bridge 45 that is formed of a steam beam 46 having ends 41 sitting on the footing or post tops. In this case the beam 46 has a coated upper face. In the case shown in FIG. 4 the end of the flat-steel beam 37 is supported on its underside by a slide bearing 48 that is formed generally of a PTFE plate 49 and an austenitic steel plate 50 that is made slick with oil or grease. The posts 51 for it form with the adjacent track support 52 the illustrated expansion joint 53.

The track bridge shown in FIG. 4 is needed to extend over an accessible inspection space 54 under the playing field. The bridge 45 thus so to speak covers the inspection space. The overall slide-track bridge is provided with vertically adjustable supports 55 in order to adjust the height of the bridge ends. Further when the track bridge is dropped the entire slide bearing is unloaded and can be taken apart laterally, that is the slide bearings can be checked and if necessary replaced one at a time. The upper or lower flange is provided according to FIG. 5 with a hand and repair opening 56 in order to be able to change PTFE plates when damaged or worn. Above the hand opening there can be an oil catchment 57 or receptacle.

Figure 6:
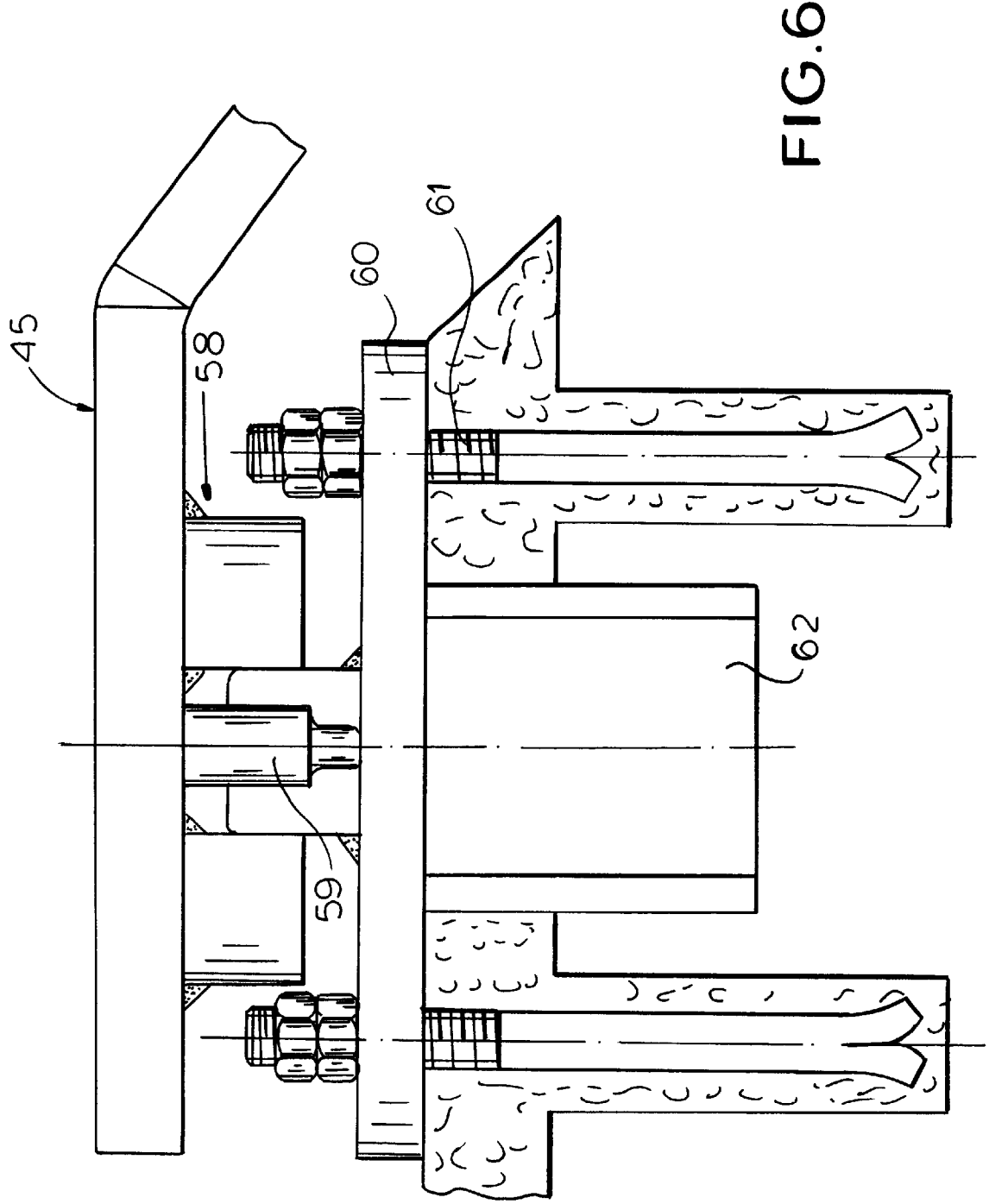
FIG. 6 is the anchor of a post for a rail bridge on a support wall.

FIG. 6 shows a track-bridge end 45 with a vertically adjustable bearing 58 that is vertically adjustable by screws 59. The support is formed by a plate 60 that has four anchor bolts 61 and respective anchor pins 62.

Figure 7:
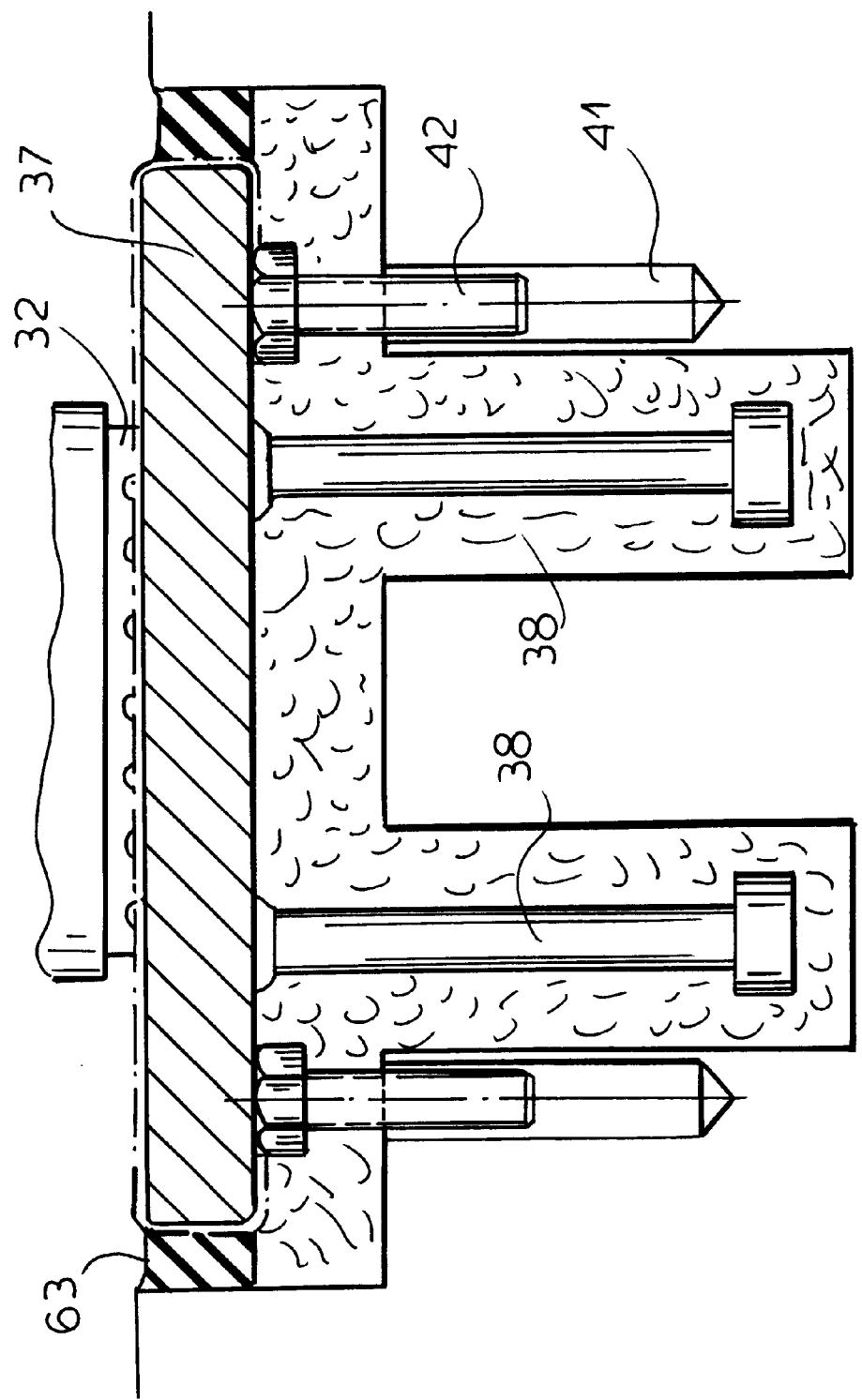
FIG. 7 is a section of the anchor of the slide rail on a concrete beam.
Figure 8:
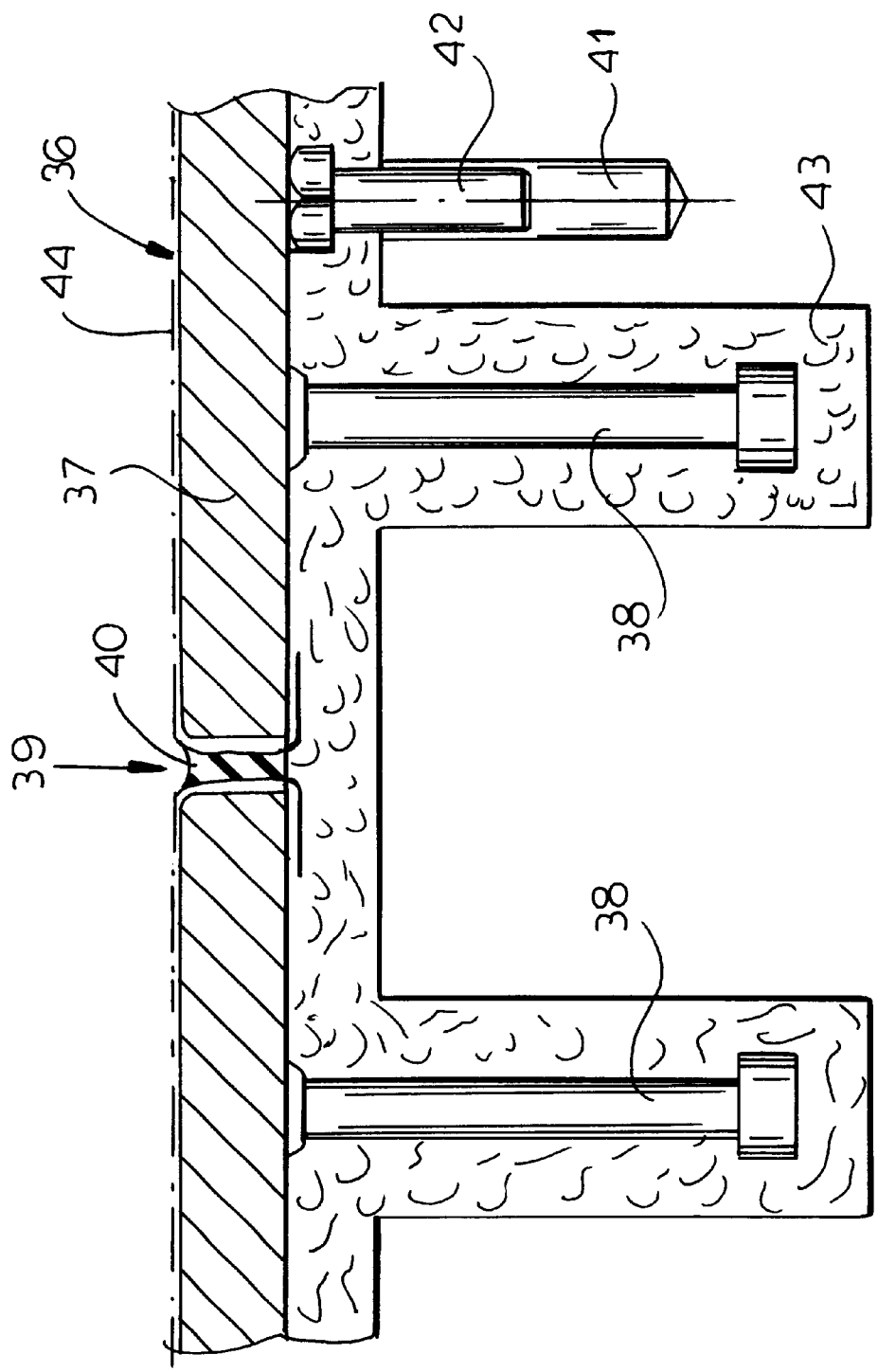
FIG. 8 is a section of two rail ends.

As shown in FIG. 7 the slide tracks can be provided laterally with durable elastic seals 63.

Figure 9:
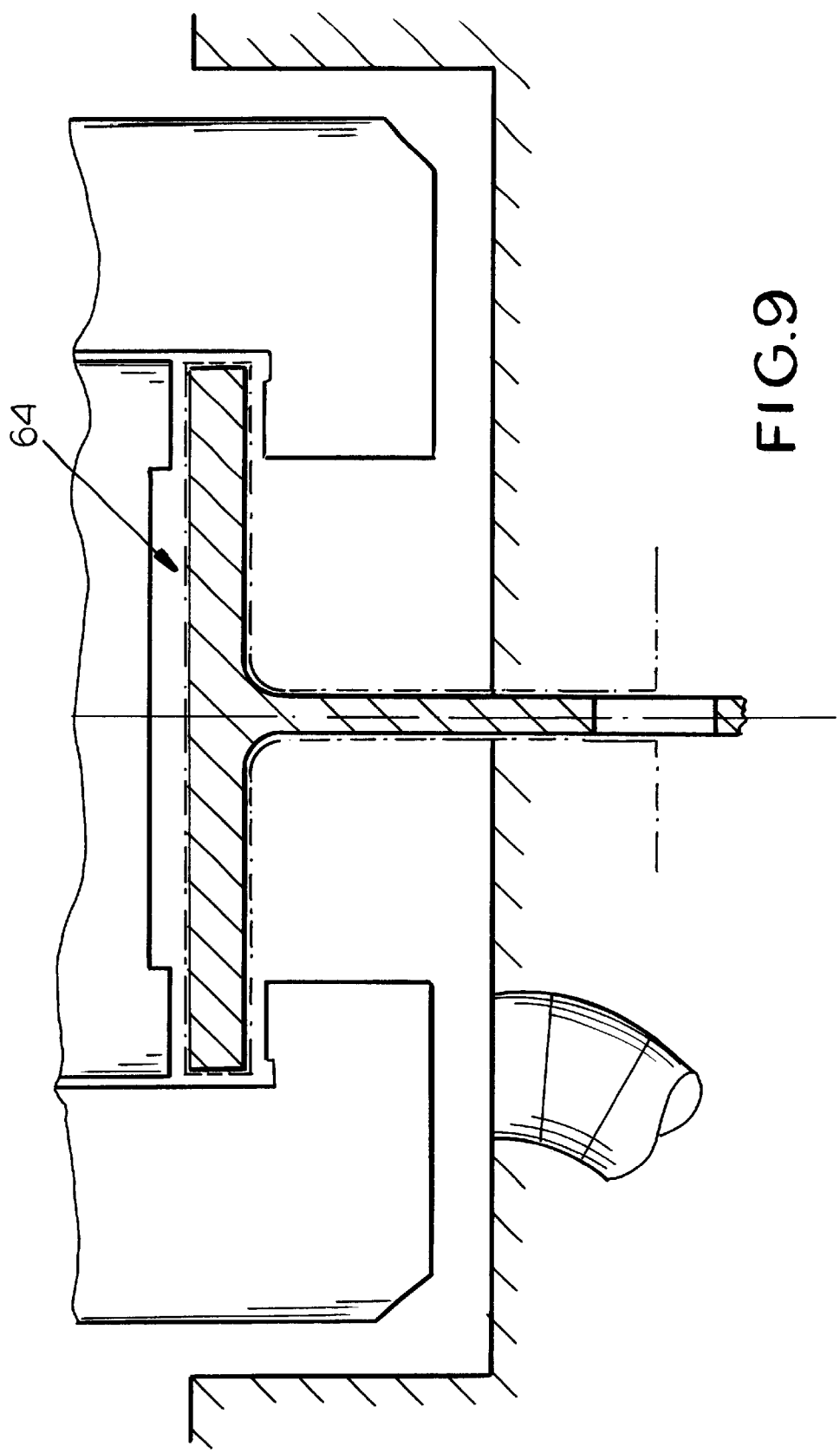
FIG. 9 is a section of a profile for retaining a slide assembly.
Figure 10A:
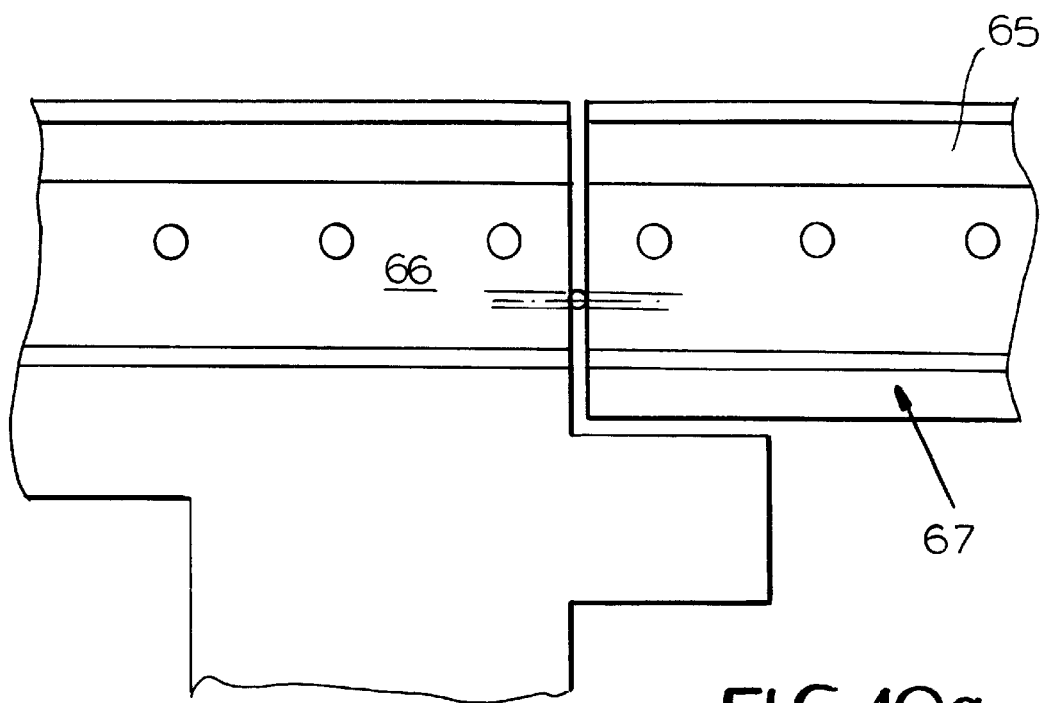
FIGS. 10*a* and 10*b* are side and sectional views of the profile beam at an inspection space.
Figure 10B:
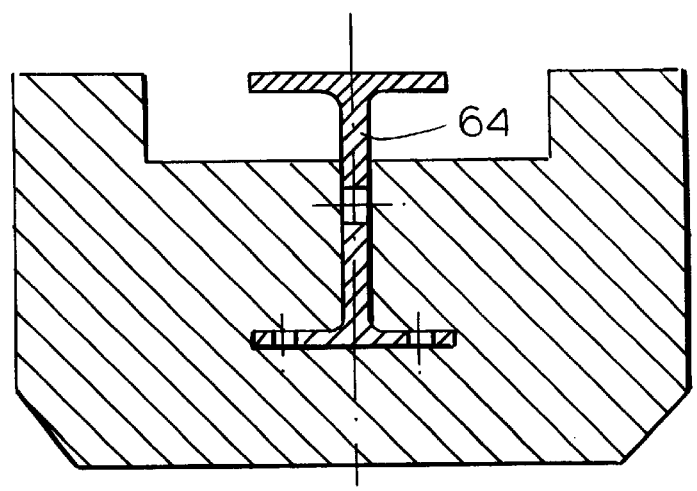
Figure 11:
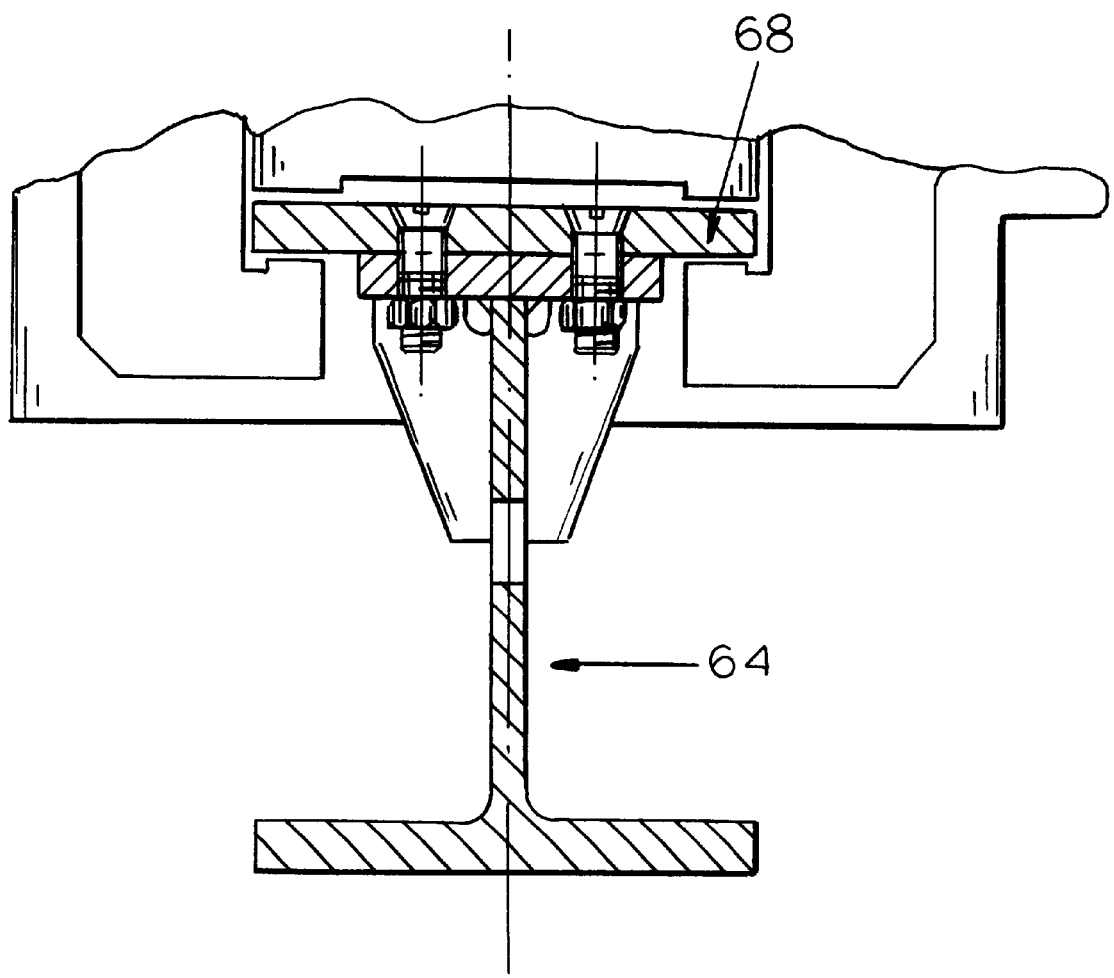
FIG. 11 is two views of the profile beam of FIG. 9 and 10 at the end of a slide rail.

The slide-actuator support shown in FIGS. 9 to 11 fixes in place a sliding device 64 that extends parallel the slide track over part of its length and that is formed of T- or I-profile whose upper flange 65 is fixable to the arms of a sliding actuator. If four slide actuators are used to horizontally shift the support frame 22, there are then correspondingly equidistantly spaced four slide tracks. Using a jaw gripper between the slide actuators and the upper flanges 65 makes it possible to mount these in one place. In order to manage the slide forces, holes are provided in the webs 66 of the slide tracks through which the reinforcing bars of the concrete base extend so as to solidly anchor them. The entire profile 64 is sunk two-thirds in the concrete 67. Only the upper flanges 65 and parts of the web 66 serve for engagement with the actuating devices. At the end or start of the slide tracks there is an installation/removal port for the slide actuators where the clamping jaws of the unillustrated slide actuators can be installed and replaced by removal of the screwed-down upper plate 68.

The sliding actuators (see catalog of Schiess-Defries No. 571-HYVG/9012 W., Type 3100–3900) comprise a forged part with cylinder bores for receiving vertically moving double-acting pistons. These pistons engage via a pressure plate on the upper flange of the slide track. Clamping jaws are screwed to the sides of the base body which engage when pressure is exerted on the pressure plate under the upper flange 65. In this clamped position the sliding actuator operates as a horizontal bearing point for the slide cylinder which is braced on the sliding actuator and pushes or pulls the playing field or the support frame through its stroke. After an actuation, which is carried out synchronously by all the slide actuators, the clamping is released, that is the pistons go up and the slide cylinder advances so that the slide actuator is advanced by the stroke of the cylinder. Subsequently another clamping of the slide actuator takes place, the cylinder is advanced and so on until the entire slide distance has been traversed. The slide cylinders may or may not be provided with travel sensors, although for controlling the movement of the playing field cylinders with travel sensors are preferable. The four slide actuators with eight cylinders that are used are controlled by a system for detecting skewness. The pushing force of the cylinders is dependent on the weight of the playing field and in this application can be 8×900 kN. The slide actuators should be able to grip with a force of 4×15,000 kN.

In addition extending longitudinally in the middle of the playing field and underneath the playing field is a guide track in which spring-loaded guide rollers run that are fixed on the structure of the playing field. These rollers serve to monitor linear movement parallel to the longitudinal axis of the field. Through appropriate arrangement of switches for monitoring nonstraight movement it is possible when there is a deviation from rectilinear travel to switch off the slide actuators. Once the position is corrected the playing field is again moved. Preferably the playing field is provided with warning lamps which are switched on during its advance. At each corner of the field or frame 22 are emergency cutoff switches while in addition during the movement an acoustic warning signal is emitted.

An unillustrated pump station beneath the playing field ensures a redundant pneumatic feed of the lubricant to the individual oil applicators 38 by main conduits, valves, progressive applicators, and tubing to the slide bearings. The conduits and tubes can be provided in conduits underneath the field. If necessary manifolds for supplying individual groups of posts, e.g. eight slide pads, are used. The oil is pumped periodically during actuation of the slide actuators to the oil applicators and from there to the slide tracks 36 and 45. The felt strips form a thin lubricant film on the slide track. The lubricating system is preferably controlled electrically to which end a corresponding electrical hookup is provided under the playing field. The playing field or the support frame 22 can be supplied via slide cables with current.

Finally control devices are provided including a dead-man switch. The control devices serve when the field moves skew to shut off individual slide actuators. The control devices are connected according to need with the skew-travel monitoring system and also provide the necessary signal for the lubricating system.

What is claimed is:

1. A team-sport playing field comprising:
   a rigid trough-shaped support frame;
   a playing surface of grass or particles on a bed of earth or clay on the frame;
   a plurality of stationary steel tracks underneath the frame;
   respective low-friction plastic pads on the frame engaging the tracks and slidably supporting the frame on the tracks;
   a plurality of stationary profile beams between and parallel to the tracks;
   drive means including respective actuators fixed on the frame and carrying clamps releasably engageable with the profile beams and advanceable through respective strokes substantially shorter than the beams for sliding the frame on the tracks in steps; and
   control means for monitoring the position of the frame relative to the tracks for operating the actuators and moving the frame parallel to the tracks.

2. The team-sport playing field defined in claim 1 wherein the tracks extend from a fully or partially covered stadium or multipurpose hall to an adjacent outside space.

3. The team-sport playing field defined in claim 2 wherein the frame is slidable underneath reviewing stands in the stadium or multipurpose hall.

4. The team-sport playing field defined in claim 1 wherein the pads consist of polytetrafluorethylene and the slide tracks are made of coated steel or austenitic steel.

5. The team-sport playing field defined in claim 1 wherein the pads have lubricant pockets.

6. The team-sport playing field defined in claim 1, further comprising
   means for applying a thin lubricant film to the tracks.

7. The team-sport playing field defined in claim 1 wherein the support frame includes a plurality of vertical support posts arranged in parallel rows and having anchor plates having undersides provided with support plates each carrying a plurality of respective elastomeric bodies vulcanized to the support plates and a plurality of low-friction plastic pads.

8. The team-sport playing field defined in claim 7, further comprising
   means on the frame for applying a lubricant to the tracks in front of and behind the pads.

9. The team-sport playing field defined in claim 8 wherein the lubricant-applying means includes a plurality of protective housings secured on the frame and extending around and over the support plate and provided with dirt scrapers guided on the slide tracks and mounted on edges of the respective housings turned toward the slide tracks.

10. The team-sport playing field defined in claim 1 wherein the slide tracks are formed of wide steel bars.

11. The team-sport playing field defined in claim 1 wherein the slide tracks are formed as steel beams that sit on footings.

12. The team-sport playing field defined in claim 11 wherein the slide tracks have a surface coating of a thickness from 300 $\mu$m to 400 $\mu$m which has an orange-peel surface optimized for sliding friction.

13. The team-sport playing field defined in claim 1 wherein the slide tracks are formed of several pieces with between adjacent pieces at their ends a long-life elastic expansion joint.

14. The team-sport playing field defined in claim 1 wherein each slide track has an underside provided in the region of a slide-track end with a low-friction plastic bearing supporting the respective expansion joint.

15. The team-sport playing field defined in claim 1 wherein the support tracks have upper and lower flanges provided with openings for repair work through which the pads can be passed for replacement.

16. A method of moving a team-sport playing field comprising:

a rigid trough-shaped support frame;

a playing surface of grass or particles on a bed of earth or clay on the frame;

a plurality of stationary steel tracks underneath the frame;

respective low-friction plastic pads on the frame engaging the tracks and slidably supporting the frame on the tracks;

a plurality of stationary profile beams between and parallel to the tracks; and respective actuators fixed on the frame and carrying clamps releasably engageable with the profile beams, the method comprising the steps of a) engaging all the clamps with the respective profile beams;

b) advancing the clamps parallel to the tracks by means of the respective actuators through respective strokes substantially shorter than the beams and thereby sliding the frame on the tracks in a step having a length equal to the stroke;

c) releasing the clamps from the respective profile beams;

d) retracting the clamps parallel to the clamps by means of the respective actuators through the respective strokes; and e) repeating steps a) through d) until the field is in a desired position.

\* \* \* \* \*

UNITED STATES PATENT AND TRADEMARK OFFICE
CERTIFICATE OF CORRECTION

PATENT NO. : 6,286,264 B1
DATED : September 11, 2001
INVENTOR(S) : Raimund Peuler et al.

It is certified that error appears in the above-identified patent and that said Letters Patent is hereby corrected as shown below:

<u>Title page,</u>
Item [75], Inventor, please add second inventor to read as follows:
-- Georg Wessel, Grefrath (DE) --

Signed and Sealed this

Thirtieth Day of April, 2002

Attest:

JAMES E. ROGAN
*Attesting Officer*  *Director of the United States Patent and Trademark Office*